(12) United States Patent
Rajendran et al.

(10) Patent No.: US 11,842,257 B2
(45) Date of Patent: Dec. 12, 2023

(54) SYSTEM AND METHOD FOR PREDICTING AND SCORING A DATA MODEL

(71) Applicant: Marlabs Innovations Private Limited, Bengaluru (IN)

(72) Inventors: Senthil Nathan Rajendran, Bengaluru (IN); Selvarajan Kandasamy, Bengaluru (IN); Tejas Gowda BK, Bengaluru (IN); Mitali Sodhi, Bengaluru (IN); Gulshan Gaurav, Bengaluru (IN)

(73) Assignee: Marlabs Incorporated, Piscataway, NJ (US)

( * ) Notice: Subject to any disclaimer, the term of this patent is extended or adjusted under 35 U.S.C. 154(b) by 1240 days.

(21) Appl. No.: 16/033,448

(22) Filed: Jul. 12, 2018

(65) Prior Publication Data

US 2019/0197361 A1 Jun. 27, 2019

(30) Foreign Application Priority Data

Dec. 27, 2017 (IN) .............................. 201741046795

(51) Int. Cl.
```
G06N 20/00        (2019.01)
G06K 9/62         (2022.01)
G06N 20/20        (2019.01)
G06F 18/21        (2023.01)
G06F 18/40        (2023.01)
G06F 18/20        (2023.01)
G06F 18/2115      (2023.01)
```

(52) U.S. Cl.
CPC ......... *G06N 20/20* (2019.01); *G06F 18/2115* (2023.01); *G06F 18/2193* (2023.01); *G06F 18/285* (2023.01); *G06F 18/40* (2023.01); *G06N 20/00* (2019.01)

(58) Field of Classification Search
CPC ..... G06N 20/00; G06K 9/6227; G06K 9/6231
USPC ....................................................... 706/12
See application file for complete search history.

(56) References Cited

U.S. PATENT DOCUMENTS

| | | |
|---|---|---|
| 7,509,337 B2 | 3/2009 | Chitgupakar et al. |
| 7,756,804 B2 | 7/2010 | Bloom et al. |
| 2015/0269495 A1 | 9/2015 | Dalessandro et al. |

(Continued)

FOREIGN PATENT DOCUMENTS

CN 106255965 A 12/2016

*Primary Examiner* — Jeffery A Williams
(74) *Attorney, Agent, or Firm* — Jason C. Cameron

(57) ABSTRACT

System and method for predicting and scoring a data model are provided. The system includes a memory configured to receive a plurality of data sets. The system also includes a processing subsystem operatively coupled to the memory and configured to select one or more variables based on a plurality of parameters, to apply feature engineering and transformation on one or more variables to extract a plurality of features from the plurality of data sets, to build new data model based on the plurality of features, to evaluate a classification technique to select a right machine learning model based on a plurality of elements, to predict a newly built data model based on an evaluated classification technique and score the predicted data model. The system further includes a display model operatively coupled to the processing subsystem and configured to present the predicted and scored data model in one or more forms.

10 Claims, 13 Drawing Sheets

(56) References Cited

U.S. PATENT DOCUMENTS

2018/0075357 A1* 3/2018 Subramanian ......... G06N 20/00
2019/0188584 A1* 6/2019 Rao ....................... G06Q 10/00

* cited by examiner

| SIGNALS | Signals | | | Search signals | |
|---|---|---|---|---|---|
| APPS | CREATE SIGNAL | Churn Analysis | Churn Analysis Test |
| DATA | | Nov 16.2017 22:59 | Nov 16.2017 19:38 | Nov 16.2017 18:28 |
| | Customer Engagement... | Churn Analysis Final | Portfolio Returns Analysis | Inventory Estimation An... |
| | Nov 16.2017 18:01 | Nov 16.2017 16:30 | Nov 16.2017 16:25 | Nov 15.2017 21:12 |
| | CC Return Rate | Employee Attrition An... | Customer Churn | Repurchase Rate |
| | Nov 15.2017 19:29 | Nov 15.2017 19:27 | Nov 15.2017 19:25 | Nov 15.2017 17:24 |

| PREDICTION | RULES | PERCENTAGE |
|---|---|---|
| Height | Average Call duration (in Minutes)<=708. First call resolution > 520 | 100 |
| | Average Call duration (in Minutes)<=708. First call resolution > 450 First call resolution <= 520 | 60 |
| | Average Call duration (in Minutes)<=708. First call resolution > 450 First call resolution > 520 | 100 |
| Medium | Average Call duration (in Minutes)<=708. First call resolution <= 520 First call resolution <= 120 | 50.98 |
| | Average Call duration (in Minutes)<=708. First call resolution <= 450 Agent Age in (36 to 45 Below 25.31 to35) | 57.01 |
| Low | Average Call duration (in Minutes)<=708. First call resolution <= 450 Agent Age in (36 to 45 Below 25.31 to35) | 99.79 |
| | Average Call duration (in Minutes)<=708. First call resolution <= 450 | 97.63 |

FIG. 9 (Cont'd)

SYSTEM AND METHOD FOR PREDICTING AND SCORING A DATA MODEL

CROSS-REFERENCE TO RELATED APPLICATION

This application claims the benefit of Complete Patent Application bearing application no. 201741046795, filed on Dec. 27, 2017 in India.

BACKGROUND

Embodiments of the present disclosure relate to predicting of data model, and more particularly to system and method for predicting and scoring a data model.

A data model is an abstract model that organises elements of data and standardises how they relate to one another and to properties of real world entities. Predicting the data model is a process that uses data mining and probability to forecast outcomes. Each model is made up of a number of predictors, which are variables that are likely to influence future results.

In one approach, the data model is evaluated based on a validation done on a plurality of data sets. The system also builds a new model based on a plurality of parameters and a plurality of machine learning models. One such parameter is iteration. The system selects a specific machine learning model from the plurality of machine learning models to create a new data model which has to be evaluated. However, in such systems data integration and data pre-processing is not achieved. Also such systems do not select a type of variable which has to be evaluated. Also the plurality of parameters has to be selected manually. Further the presentation of the data model is not easily comprehensible by a user.

In another approach, the system may generate and evaluate a data model based on a data pre-processing engine. The system selects a best data model by comparing a plurality of stored data models to generate a new data model. The system also performs validation on the selected data model based on the plurality of parameters and by selecting a suitable machine learning algorithm from a plurality of machine learning algorithms. One such parameter is obtained based on the highest accuracy provided by the stored plurality of machine learning models. However, in such system integrating the plurality of internal data sets with the plurality of external data sets is not being achieved. Also the system does not provide enhancement of the plurality of data sets.

In yet another approach, the system performs a data pre-processing using an engineering model to build a new data model and to evaluate the same. The system also enhances the quality of the newly built model and also performs validation on the built model. The system also selects one or more variable automatically based on which the evaluation has to be done. The system also performs the evaluation of the data model in real time and based on batch mode. However, the system does not integrate the plurality of internal data sets and the plurality of external data sets. Also the system does not select the appropriate machine learning algorithm from the plurality of stored algorithm. Also the system does not perform model scoring. Further the presentation of insights in such system is complicated which lower the efficiency of the system.

In one approach, the prediction of the data model is done automatically on a set of huge data which gives accurate prediction. However, in such systems analysis and presentation of insights takes a long time. Also selecting a relevant feature at a scale is very complex and the predicted data has to be formed into a report or a presentation for a better understanding. Further, such systems lack skilled data scientists and data analysts to create the report or the presentation for a better understanding.

Hence, there is a need for an improved system and method for predicting and scoring a data model to address the aforementioned issue.

BRIEF DESCRIPTION

In accordance with one embodiment of the disclosure, a system and method for predicting and scoring a data model are disclosed. The system includes a memory configured to receive a plurality of data sets. The system also includes a processing subsystem operatively coupled to the memory and configured to select one or more variables based on a plurality of parameters. The processing subsystem is also configured to apply feature engineering and transformation on one or more variables to extract a plurality of features from the plurality of data sets. The processing subsystem is further configured to build new data model based on the plurality of features. The system is further configured to evaluate a classification technique to a select a right machine learning model based on a plurality of elements. The processing subsystem is further configured to predict a newly built data model based on an evaluated classification technique. The processing subsystem is further configured to score the predicted data model. The system further includes a display model operatively coupled to the processing subsystem and configured to present the predicted and scored data model in one or more forms.

The method for predicting and scoring a data model includes receiving a plurality of data sets. The method also includes selecting one or more variables based on a plurality of parameters. The method further includes applying feature engineering and transformation on one or more variables to extract a plurality of features from the plurality of data sets. The method further includes building new data model based on the plurality of features. The method further includes evaluating a classification technique to a select a right machine learning model based on a plurality of elements. The method further includes predicting a newly built data model based on an evaluated classification technique. The method further includes scoring the predicted data model. The method further includes presenting the predicted and scored data model in one or more forms.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 3 is a schematic representation of first page of a graphical user interface of the system for prediction and scoring of data of FIG. 1 in accordance with an embodiment of the present disclosure;

FIG. 4 is a schematic representation of second page of the graphical user interface of the system for prediction and scoring of data of FIG. 1 in accordance with an embodiment of the present disclosure;

FIG. 6 is a schematic representation of fourth page of the graphical user interface of the system for prediction and scoring of data of FIG. 1 in accordance with an embodiment of the present disclosure;

Figure 1:
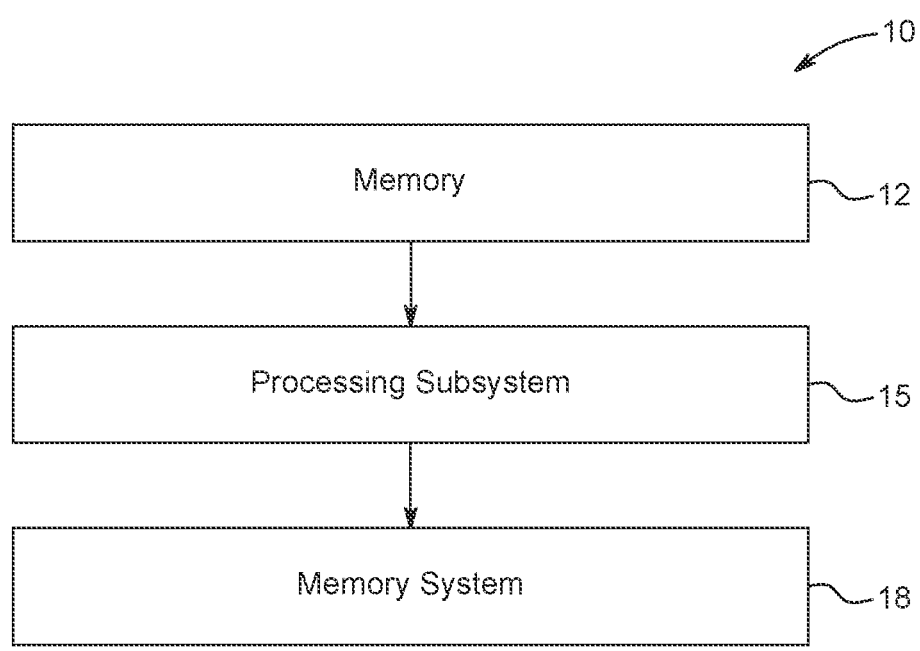
FIG. 1 is a block diagram of a system for predicting and scoring a data model in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to system and method for predicting and scoring a data model. The system for predicting and scoring a data model includes a memory configured to receive a plurality of data sets. The system also includes a processing subsystem operatively coupled to the memory and configured to select one or more variables based on a plurality of parameters. The processing subsystem is also configured to apply feature engineering and transformations on one or more variables to extract a plurality of features from the plurality of data sets. The processing subsystem is further configured to build new data model based on the plurality of features. The system is further configured to evaluate a classification technique to a select a right machine learning model based on a plurality of elements. The processing subsystem is further configured to predict a newly built data model based on an evaluated classification technique. The processing subsystem is further configured to score the predicted data model. The system further includes a display model operatively coupled to the processing subsystem and configured to present the predicted and scored data model in one or more forms.

FIG. 1 is a block diagram of a system for predicting and scoring a data model in accordance with an embodiment of the present disclosure. The system (10) includes a memory (12) configured to receive a plurality of data sets. In one embodiment, the plurality of data sets may be received by a web, a local data, an experimental data or by manually entering the data into the memory. In another embodiment, the memory (12) may a random access memory (RAM), a read only memory (ROM), a cache memory or a flash memory. In such an embodiment, the memory (12) may store the plurality of data sets as a database. In yet another embodiment, the plurality of data sets may be a plurality of structured data, a plurality of unstructured data or a plurality of semi-structured data.

The system (10) also includes a processing subsystem (15) operatively coupled to the memory (12) and configured to select one or more variable based on a plurality of parameters. In one embodiment, one or more variable may be a categorical variable, a numerical variable or a dimension. In such embodiment, one or more variables may be selected based on a use case or a historical data. In such another embodiment, the use case and the historical data may be used to procure an external data source to enrich the plurality of data sets. In another embodiment, the plurality of data set may include receiving the plurality of data from a plurality of means such as a web, a manual entry of data, a local data and an experimental data. In yet another embodiment, the plurality of parameters may be a use case, a statistical influence and a previous predictive sample.

The processing subsystem (15) is also configured to apply feature engineering and transformation on one or more variables to extract a plurality of features from the plurality of data sets. As used herein, feature engineering is the process of using domain knowledge of the data to create features that make one or more machine learning models work.

In one embodiment, the feature engineering may select a plurality of data set based on the selected plurality of features. In such embodiment, the feature engineering may be applied to choose the plurality of features based on a plurality of elements such as a use case, a feature transformation, a feature selection and optimization based on a size of the plurality of data sets. The feature engineering may also be applied to choose the plurality of features which may best suit for a given scenario. In another embodiment, the transformations may be applied on one or more variable to extract a maximum number of features from the plurality of data sets. The processing subsystem (15) is further configured to build new data model based on the plurality of features.

The processing subsystem (15) is further configured to evaluate a classification technique to a select a right machine learning model based on a plurality of elements. In one embodiment, the plurality of elements may be a data quantity, a data volume, a computational resource, a data type, a use case, a plurality of features, a plurality of model performance and a historical model.

The processing subsystem (15) is further configured to predict a newly built data model based on an evaluated classification technique. In one embodiment, the processing subsystem (15) may predict the one or more variable using one or more technique. In such embodiment, one or more variable may be a categorical variable or a numerical variable. In such another embodiment, the one or more technique may be a classification technique, a basic statistics or a similar technique.

The processing subsystem (15) is further configured to score the predicted data model. In one embodiment, the predicted data model may be scored to check accuracy or the performance of the built data model. In such embodiment, the score may refer to a quantification of the performance on the built data model.

The system (10) further includes a display model (18) operatively coupled to the processing subsystem (15) and configured to present the predicted and scored data model in one or more forms. In one embodiment, the display model (18) may be a display on any hand held devices like a mobile phone, a tablet, a laptop or a desktop. In another embodiment, the scored data model may be displayed in one or more forms like a graph, a chart, a table or an insight. In such embodiment, the insight may be a textual insight in a natural language.

In one embodiment, the system (10) may further include an alert module which may be operatively coupled to the processing subsystem (15). The alert module may be configured to alert the system (10) in a plurality of situations. In such embodiment, the plurality of situation may be a degradation of data accuracy and a difference in the predicted model and the historical model.

Figure 2:
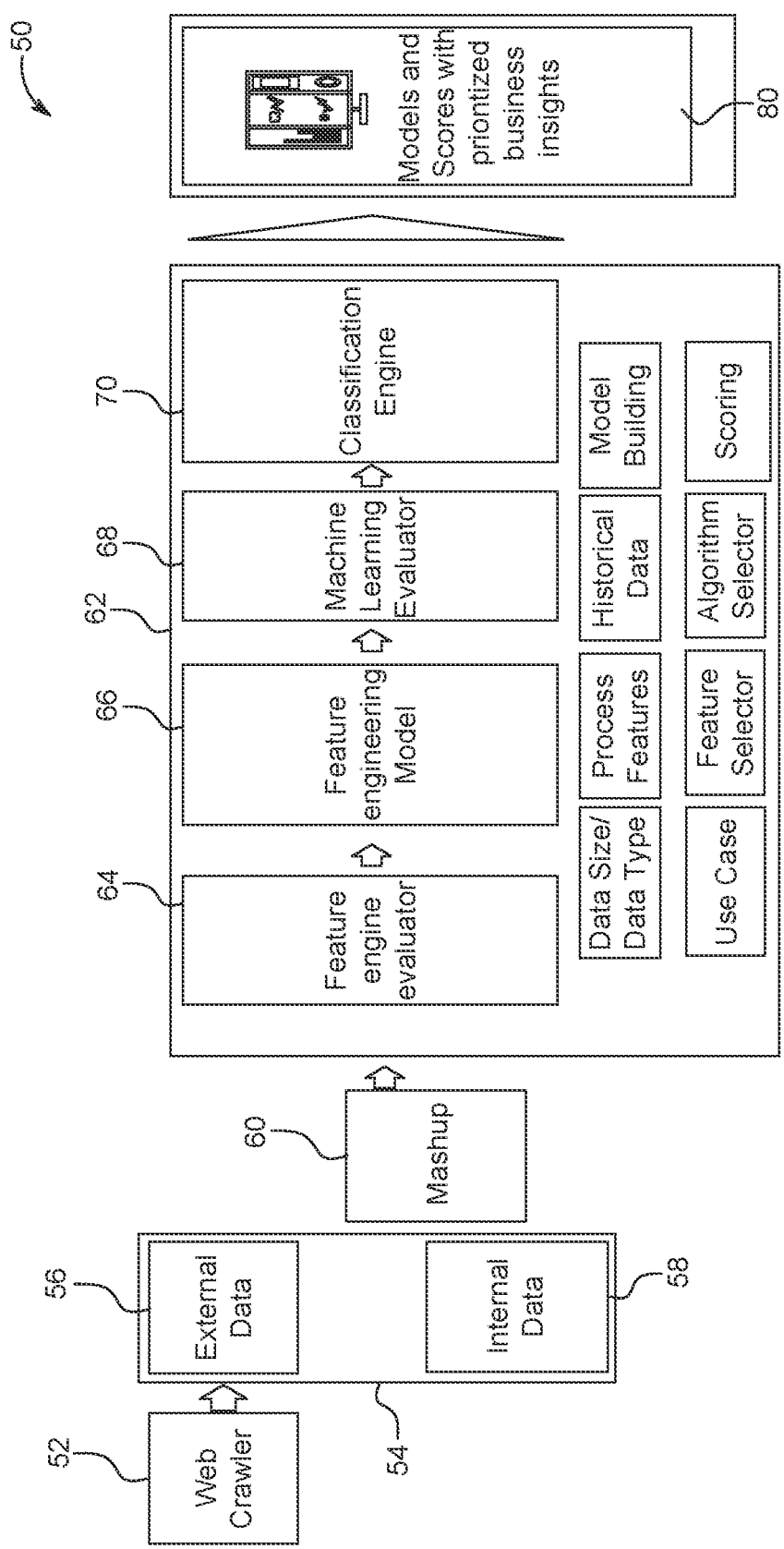
FIG. 2 is a schematic representation of an embodiment of the system for predicting and scoring a data model of FIG. 1 in accordance with an embodiment of the present disclosure.

FIG. 2 is a schematic representation of an embodiment of the system for predicting and scoring a data model of FIG. 1 in accordance with an embodiment of the present disclosure. The system (50) includes a memory device (54), a prediction engine (62) and a display module (80) which are substantially similar to a memory (12), a processing subsystem (15) and a display module (18) of FIG. 1. The memory device (54) may be configured to receive a plurality of data sets from a plurality of means such as a web (52), a manual entry of data, a local data and an experimental data. In such embodiment, the plurality of received data sets may be stored as an external data set (56). Further, the memory device (54) may merge or mashup (60) the plurality of external data set (56) and a plurality of internal data set (58). In such embodiment, the plurality of internal data set (58) may be a plurality of already existing data set or a plurality of previously verified data set. Further, the merged plurality of data set may be directed to the prediction engine for further prediction and scoring of data model.

The predictive engine (62) of the system (50) may include a feature engine evaluator (64) operatively coupled to the memory device (54) and configured to pre-process the plurality of received data. The feature engine evaluator (64) may also enhance the quality of the plurality of data. The feature engine evaluator (64) may also select a plurality of features which may be best suited for prediction and scoring of the data model.

The prediction engine (62) may also include a feature engineering model (66) operatively coupled to the feature engine evaluator (64) and configured to select a plurality of data set based on the selected plurality of features. In such embodiment, the feature engineering model (66) may choose the plurality of features based on a plurality of elements such as a use case, a feature transformation, a feature selection and optimization based on a size of the plurality of data sets. The feature engineering model (66) may also choose the plurality of features which may best suit for a given scenario. In such embodiment, the scenario may be given by a user or may be generated by the system.

The prediction engine (62) may further include a machine learning evaluator (68) operatively coupled to the feature engineering model (66) and may be configured to select a relevant machine learning model for classification of the plurality of data set. The machine learning evaluator (68) may also be configured to test and train the data model and also to check the accuracy of the data model.

The prediction engine (62) may further include a classification engine (70) operatively coupled to the machine learning evaluator (68) and may be configured to build new data model based on the plurality of selected features. The classification engine (70) may also be configured to score the built data model.

The system (50) may further present the predicted and scored data model on a display module (80). In such embodiment, the display module may be a visualization engine which may generate and present the predicted and scored data model in the form of a chart, a table, a graph or an insight.

FIG. 3 is a schematic representation of first page of a graphical user interface of the system for prediction and scoring of data of FIG. 1 in accordance with an embodiment of the present disclosure. The system (40) is an example for predicting and scoring of data model which is related to a phone call. The method includes selecting a new project to create an analysis for a set of data (40a). Hence the user may select create signal. Further, the user may select a plurality of data sets from the memory which may be the plurality of internal data sets.

Figure 4:
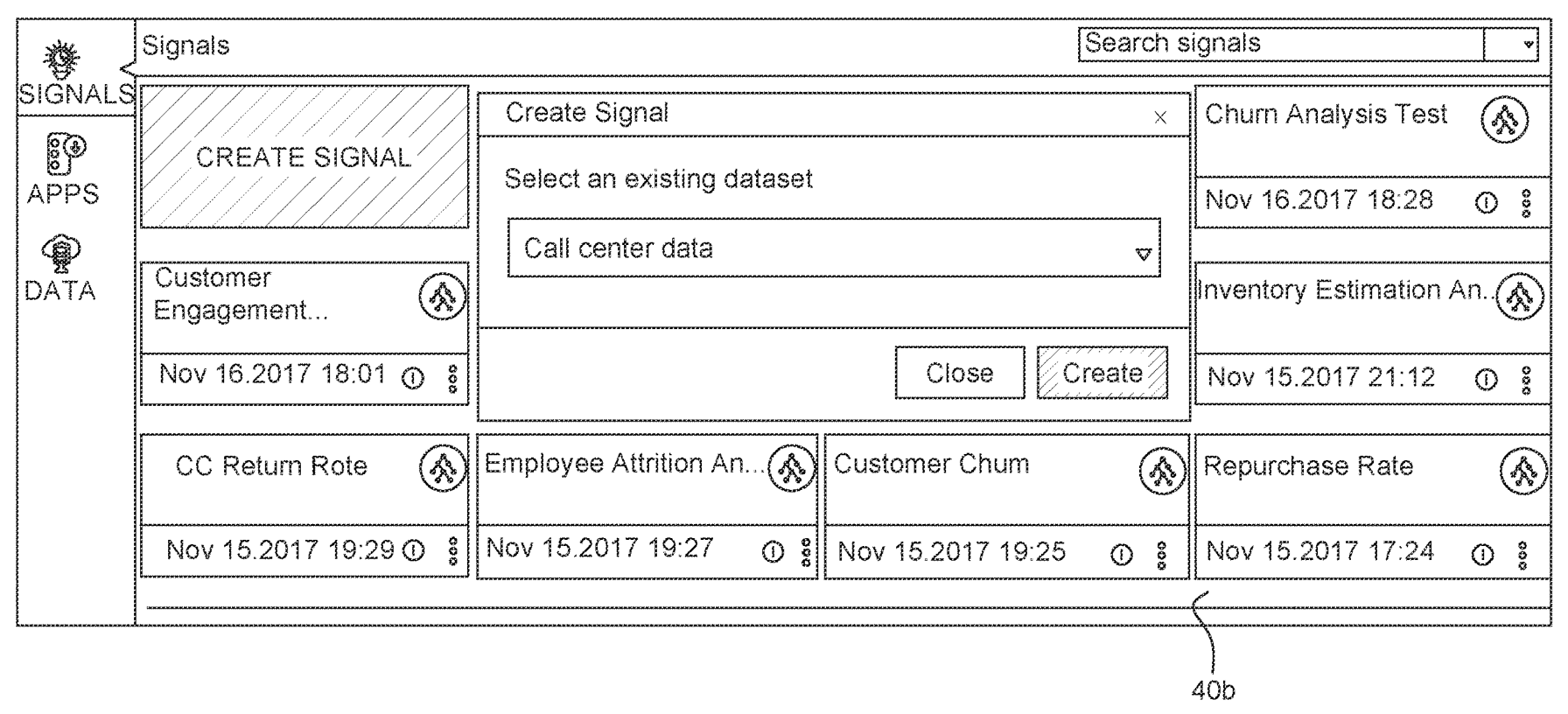

FIG. 4 is a schematic representation of second page of the graphical user interface of the system for analysis and representation of data of FIG. 1 in accordance with an embodiment of the present disclosure. The graphical user interface of the system (40) may represent the plurality of internal data and the plurality of external data in the form of rows and columns (40b).

Figure 5:
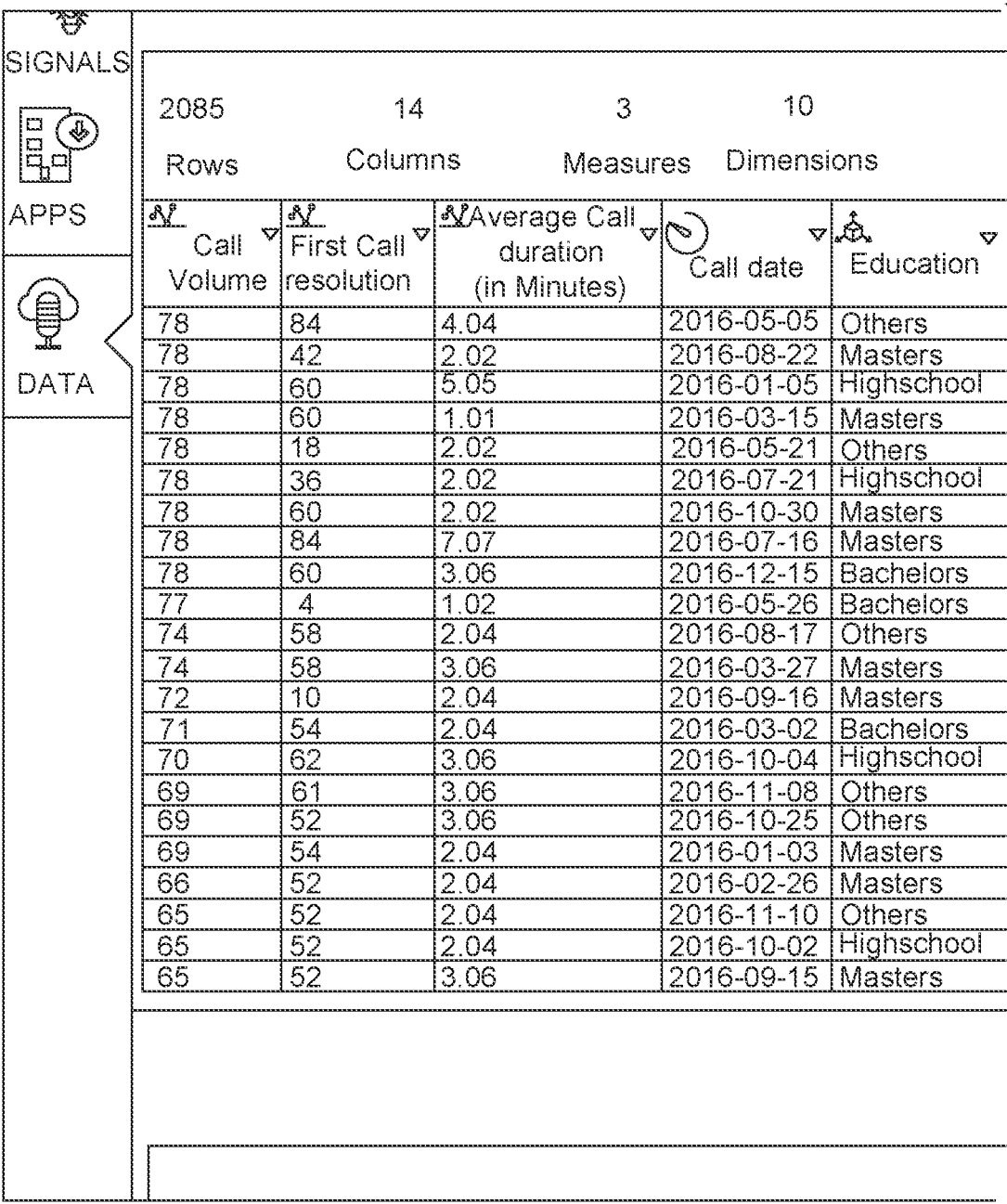
FIG. 5 is a schematic representation of third page of the graphical user interface of the system for prediction and scoring of data of FIG. 1 in accordance with an embodiment of the present disclosure.
Figure 5:
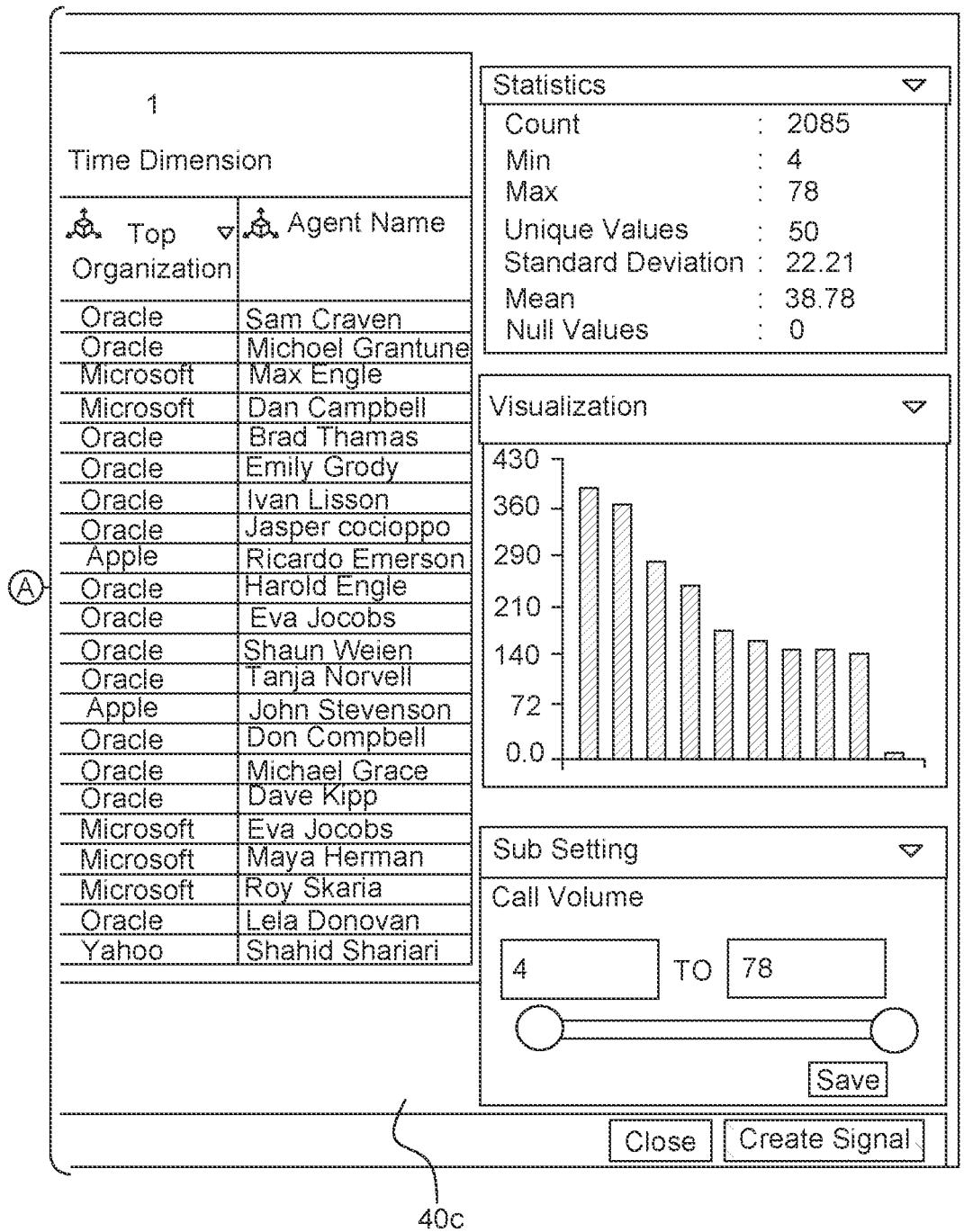

FIG. 5 is a schematic representation of third page of the graphical user interface of the system for analysis and representation of data of FIG. 1 in accordance with an embodiment of the present disclosure. The graphical user interface of the system (40) may also display a statistical data of a plurality of parameters (40*c*). In such embodiment, the plurality of parameters may be a count, a minimum value, a maximum value, a unique value, a standard deviation value, a mean and a null value. The system (40) may also display a visualization of the plurality of data sets in the form of a graph.

The system (40) may also display a sub setting slab which may allow the user to select a required range of call volume (40*c*). Once the user sets the required parameters, the user may select create signal for analysing, predicting and scoring the call data according to the selected parameters (40*c*).

Figure 6:
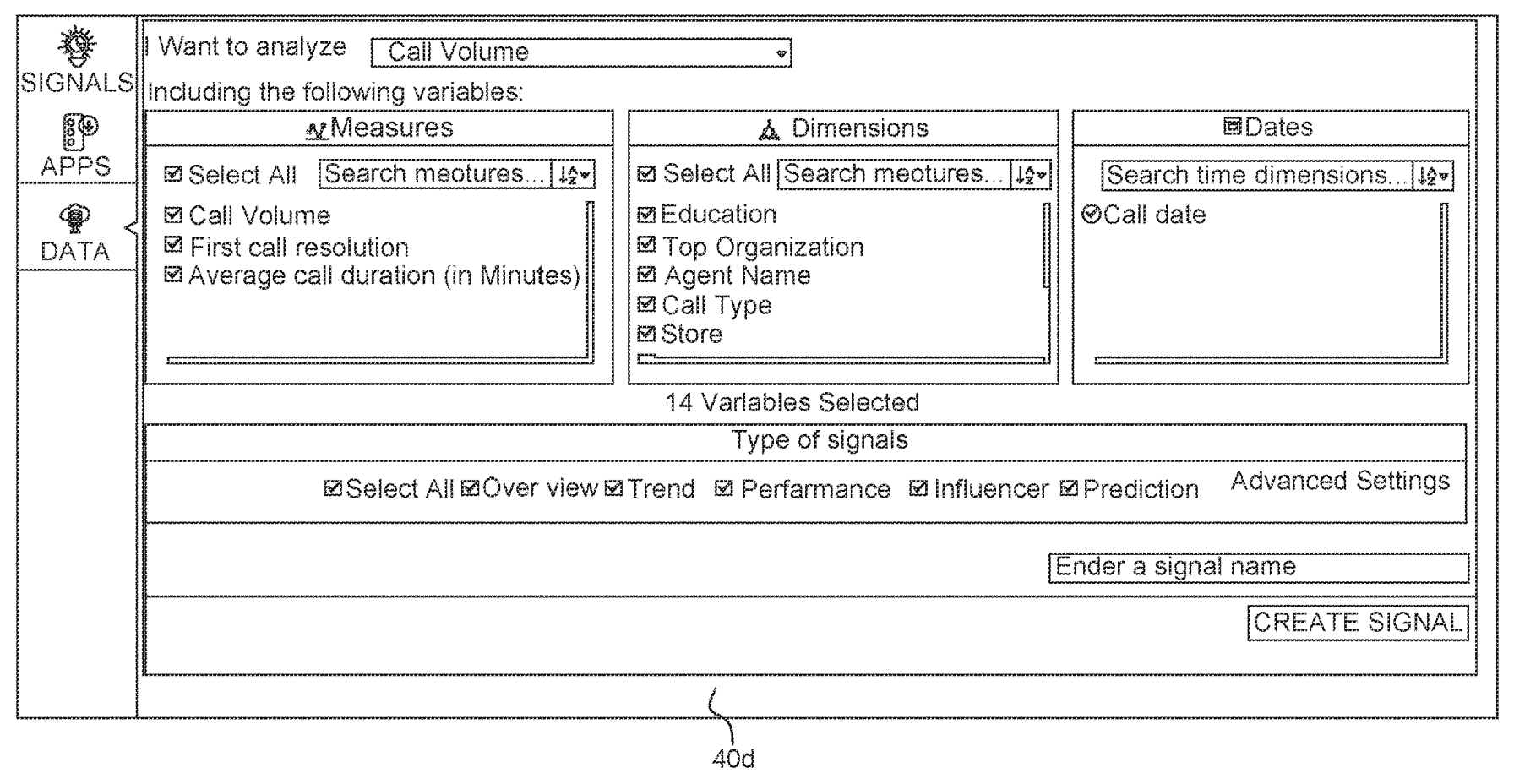

FIG. 6 is a schematic representation of fourth page of the graphical user interface of the system for analysis and representation of data of FIG. 1 in accordance with an embodiment of the present disclosure. The graphical user interface of the system (40) may display a plurality of parameters such as the measure, the dimension and the dates (40*d*). The user may now select a plurality of parameters of desired choice. Based on the selection of the parameters, the system may perform the analysis. The selected plurality of parameters under the measures may be a call volume, a first call resolution and average call duration (40*d*).

Further, the selected plurality of parameters under the dimensions may include education, a top organisation, an agent name, a call type or a state (40*d*). The user may select multiple dimensions or all the dimensions displayed. The selected plurality of parameters under the dates may include a call date. Further, once the user selects the plurality of parameters of his choice and select create signal, the system (40) may further proceed with the analysis of the call data.

Figure 7:
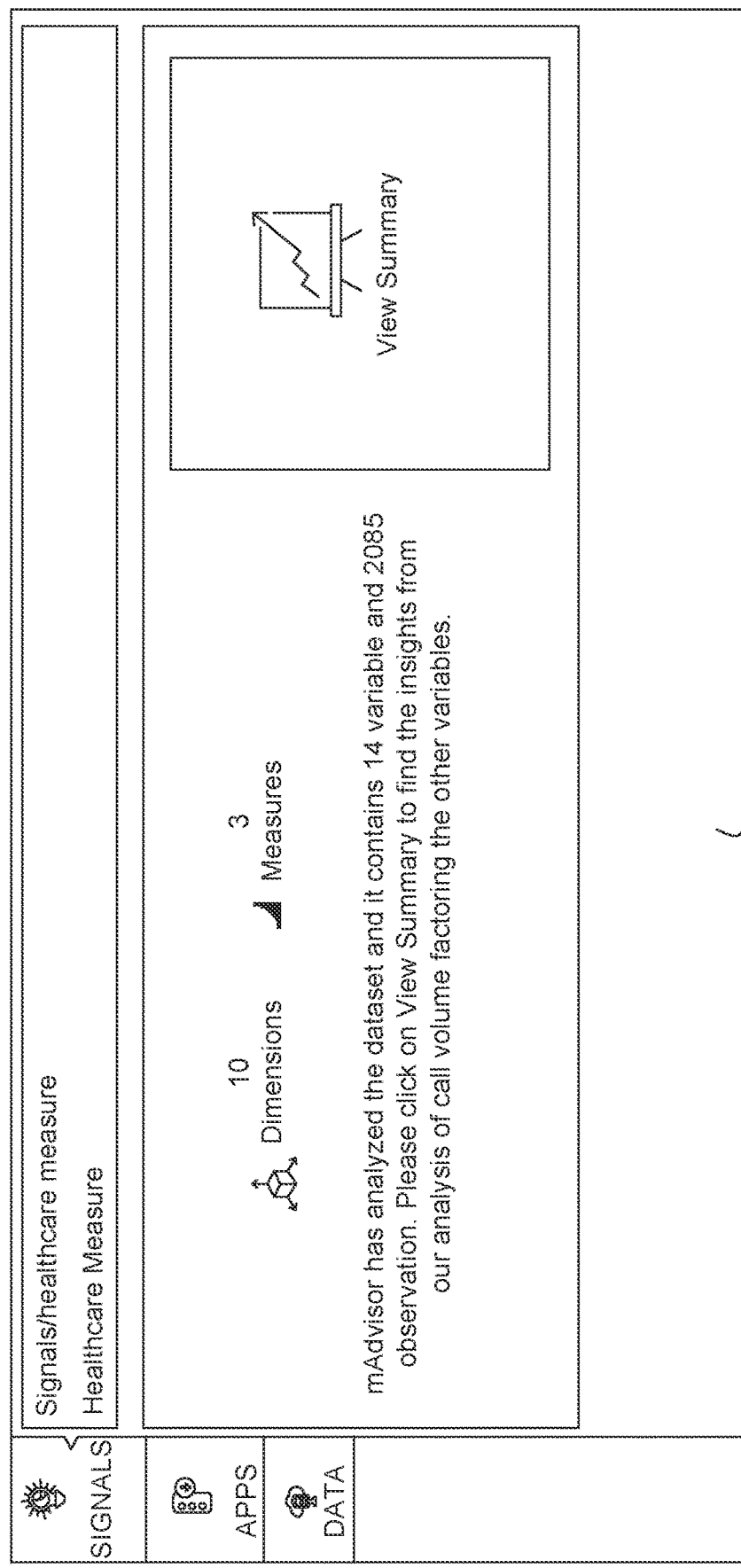
FIG. 7 is a schematic representation of fifth page of the graphical user interface of the system for prediction and scoring of data of FIG. 1 in accordance with an embodiment of the present disclosure.

FIG. 7 is a schematic representation of fifth page of the graphical user interface of the system for analysis and representation of data of FIG. 1 in accordance with an embodiment of the present disclosure. The graphical user interface of the system (40) displays the number of selected plurality of parameters and may provide an option to view a summary of the selected plurality of parameters (40*e*). As shown, the system displays 10 dimensions which may be the selected dimensions by the user (40*e*). The system may also display 3 measures, which may be the selected measures by the user (40*e*). The user may now select view summary to view the presentation of the analysed plurality of data sets and the textual insights created based on the analysed graph (40*e*).

Figure 8:
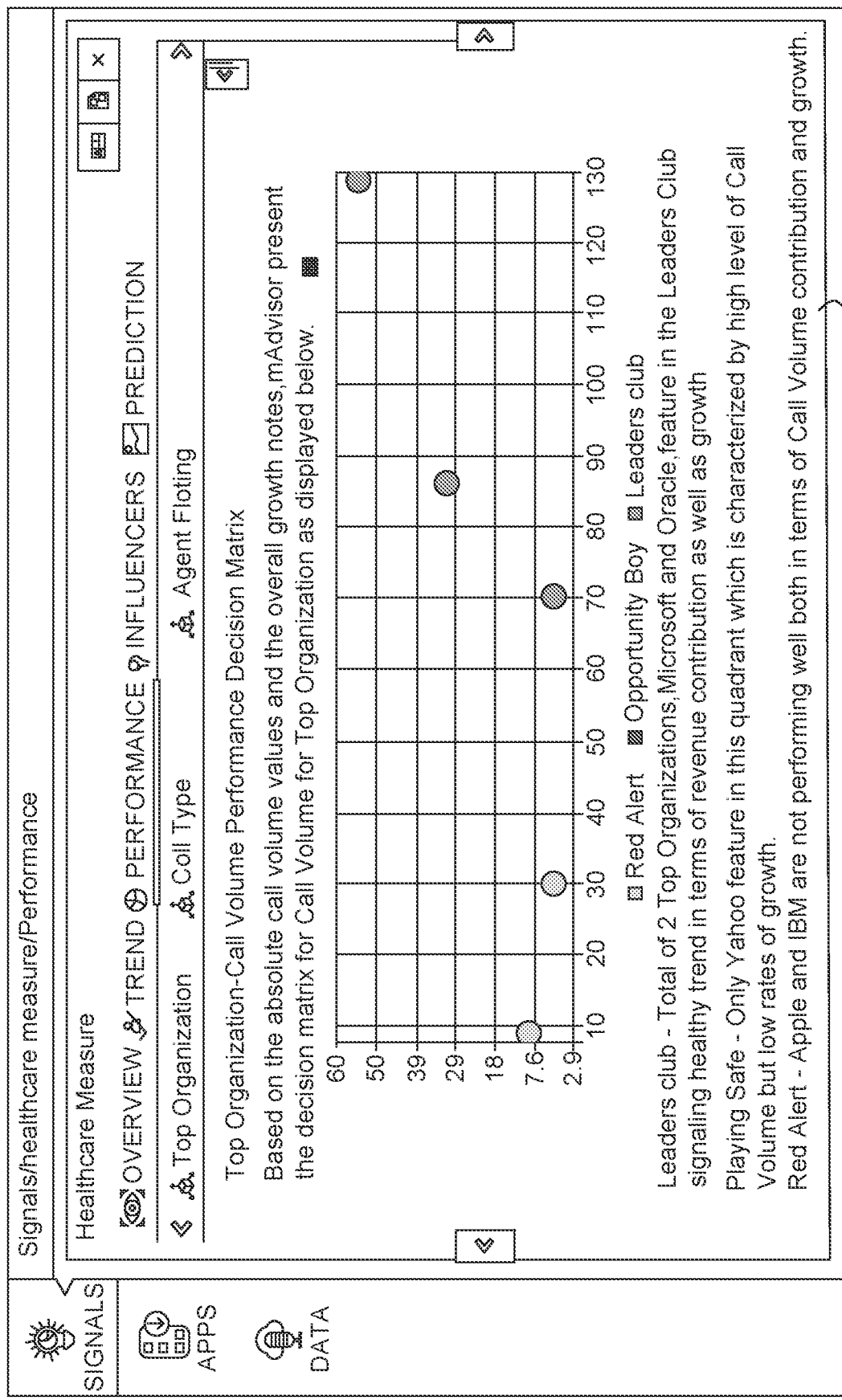
FIG. 8 is a schematic representation of sixth page of the graphical user interface of the system for prediction and scoring of data of FIG. 1 in accordance with an embodiment of the present disclosure.

FIG. 8 is a schematic representation of sixth page of the graphical user interface of the system for analysis and representation of data of FIG. 1 in accordance with an embodiment of the present disclosure. The graphical user interface of the system (40) may represent a plurality of combinations of the selected plurality of parameters and the plurality of data sets (40*f*). In one case, the system may display a graph and the textual insight for the selected plurality of parameters such as the top organisation and call volume (40*f*). In such embodiment, the display graph may be a bar graph, a line graph, a venn diagram, a histogram, a scatter plot chart, a candlestick chart, a pie chart or an area chart.

Figure 9:
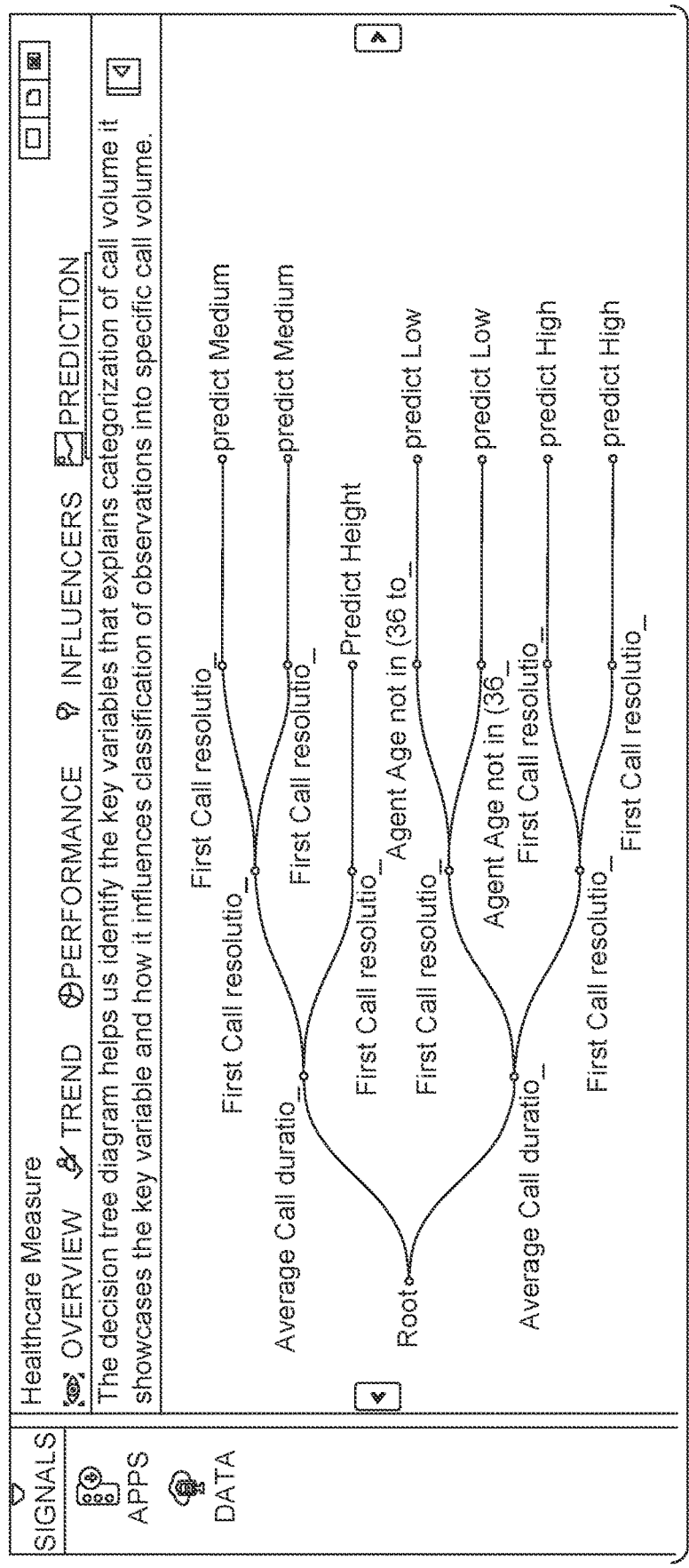
FIG. 9 is a schematic representation of seventh page of the graphical user interface of the system for prediction and scoring of data of FIG. 1 in accordance with an embodiment of the present disclosure.

FIG. 9 is a schematic representation of seventh page of the graphical user interface of the system for analysis and representation of data of FIG. 1 in accordance with an embodiment of the present disclosure. The graphical user interface of the system (40) may predict the plurality of analysed data sets based on the plurality of selected parameters (40*g*). In such embodiment, the system may predict call duration based on a plurality of pre-defined rules and display the predicted duration as low duration, high duration or medium duration (40*g*). The system may also display textual insights based on the predicted plurality of data sets (40*g*).

Figure 10:
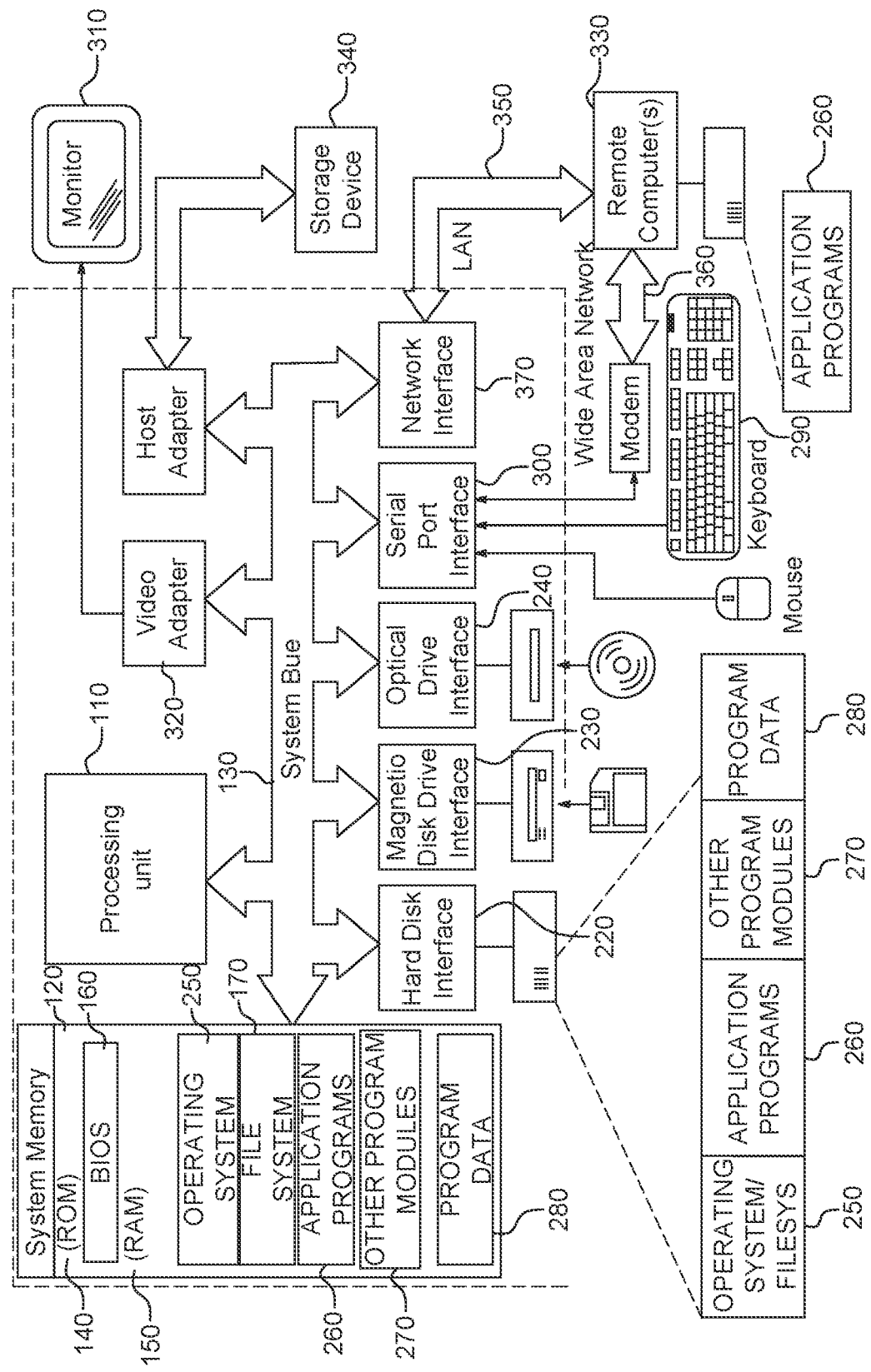
FIG. 10 is a block diagram of a computer or a server in accordance with an embodiment of the present disclosure.

FIG. 10 is an exemplary system (100) such as a computer or a server in accordance with an embodiment of the present disclosure. The exemplary system (100) for predicting and scoring of data model (10) includes a general-purpose computing device in the form of a computer (100) or a server or the like. The computer (100) includes including a processing unit (110) substantially similar to the processing subsystem (15) of FIG. 1, and configured to predict and score the data model, a system memory (120) substantially similar to the memory (12) of FIG. 1, and configured to store the plurality of internal data sets and the plurality of external data sets. The computer (100) also includes a system bus (130) that couples various system components including the system memory (100) to the processing unit (110).

The system bus (130) may be any of several types of bus structures including a memory bus or memory controller, a peripheral bus, and a local bus using any of a variety of bus architectures. The system memory (120) includes read-only memory (ROM) (140) and random access memory (RAM) (150). A basic input/output system (BIOS) (160), containing the basic routines that help transfer information between elements within the computer (100), such as during start-up, is stored in ROM (140).

The computer (100) may further include a hard disk drive for reading from and writing to a hard disk, not shown, a magnetic disk drive for reading from or writing to a removable magnetic disk, and an optical disk drive for reading from or writing to a removable optical disk such as a CD-ROM, DVD-ROM or other optical media.

The hard disk drive, magnetic disk drive, and optical disk drive 30 are connected to the system bus by a hard disk drive interface (220), a magnetic disk drive interface (230), and an optical drive interface (240), respectively. The drives and their associated computer-readable media provide non-volatile storage of computer readable instructions, data structures, program modules and other data for the computer (100) to the various results generated from the data processing unit (110).

Although the exemplary environment described herein employs a hard disk, a removable magnetic disk and a removable optical disk, it should be appreciated by those skilled in the art that other types of computer readable median that can store data that is accessible by a computer, Such as magnetic cassettes, flash memory cards, digital video disks, Bernoulli cartridges, random access memories (RAMS), read-only memories (ROMs) and the like may also be used in the exemplary operating environment.

A number of program modules may be stored on the hard disk, magnetic disk, optical disk, ROM (140) or RAM (150), including an operating system (250). The computer (100) includes a file system (170) associated with or included within the operating system (250), one or more application programs (260), other program modules (270) and program data (280). A user may enter commands and information into the computer (100) through input devices (290) such as a keyboard and pointing device. Other input devices (not shown) may include a microphone, joystick, game pad, Satellite dish, Scanner or the like.

These and other input devices are often connected to the data processing unit (110) through a serial port interface (300) that is coupled to the system bus, but may be connected by other interfaces, such as a parallel port, game port or universal serial bus (USB). A monitor (310) or other type of display device is also connected to the system bus (130) via an interface. Such as a video adapter (320). In addition to the monitor (310), personal computers typically include other peripheral output devices (not shown), such as speakers and printers.

The computer (100) may operate in a networked environment using logical connections to one or more remote computers (330). The one or more remote computer (330) may be another computer, a server, a router, a network PC, a peer device or other common network node, and typically includes many or all of the elements described above relative to the computer (100), although only a memory storage device (340) has been illustrated. The logical connections include a local area network (LAN) (350) and a wide area network (WAN) (360). Such networking environments are common place in offices, enterprise-wide computer networks, Intranets and the Internet.

When used in a LAN (350) networking environment, the computer (100) is connected to the local network (350) through a network interface or adapter (370). When used in a WAN (360) networking environment, the computer (100) typically includes a modem (380) or other means for establishing communications over the wide area network (360), such as the Internet.

The modem (380), which may be internal or external, is connected to the system bus (130) via the serial port interface (300). In a networked environment, program modules depicted relative to the computer (100), or portions thereof, may be stored in the remote memory storage device. It will be appreciated that the network connections shown are exemplary and other means of establishing a communications link between the computers may be used.

Figure 11:
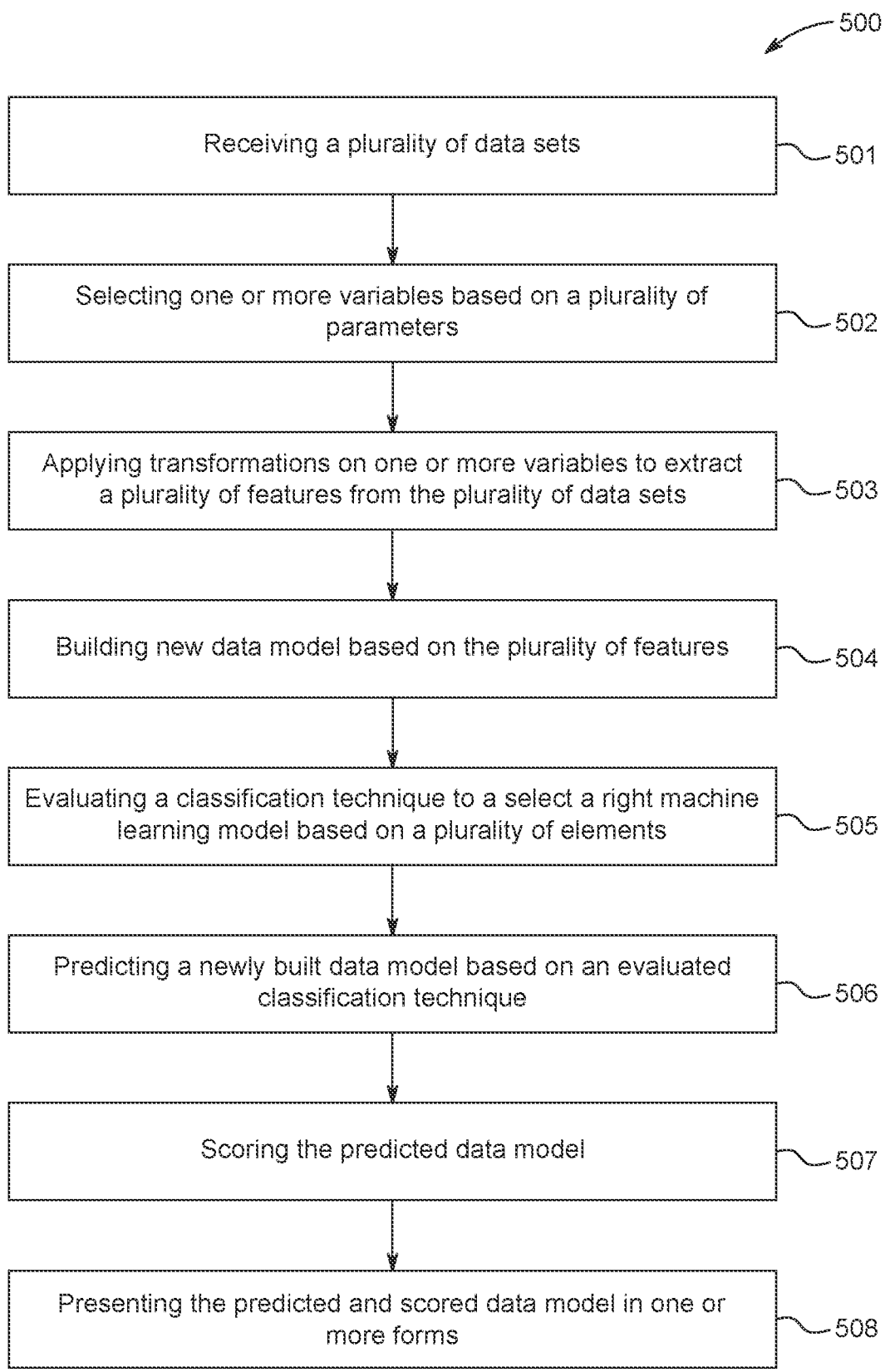
FIG. 11 is a process flow for the prediction and scoring a data model in accordance with the embodiment of the present disclosure.

FIG. 11 is a process flow for the prediction and scoring a data model in accordance with the embodiment of the present disclosure. The method (500) includes receiving a plurality of data sets (501). In one embodiment, receiving the plurality of data sets (501) may include receiving the plurality of data from a plurality of means such as a web, a manual entry of data, a local data and an experimental data.

The method (500) also includes selecting one or more variables based on a plurality of parameters (502). In one embodiment, the plurality of parameters may be a use case, a statistical influence and a previous predictive sample.

The method (500) further includes applying feature engineering and transformation on one or more variables to extract a plurality of features from the plurality of data sets (503). In one embodiment, one or more variable may be categorical variable, numerical variable or a dimension.

The method (500) further includes building new data model based on the plurality of features (504). In one embodiment, the system may build a new data model from the plurality of merged data model and the plurality of features selected for prediction and scoring of the built data model.

The method (500) further includes evaluating a classification technique to a select a right machine learning model based on a plurality of elements (505). In one embodiment, the plurality of elements may be a data quantity, a data volume, a computational resource, a data type, a use case and a historical model.

The method (500) further includes predicting a newly built data model based on an evaluated classification technique (506). In one embodiment, the system may build a new data model based on the classification technique. In another embodiment, the system may be predict and score the built data model based on the classification technique.

The method (500) further includes scoring the predicted data model (507). In one embodiment, scoring of the predicted model may be done to find out the accuracy of the built data model. In another embodiment, scoring the predicted data model may include splitting the predicted data model into a training data model and a reference data model. Scoring the predicted data model may also include learning the training data model using a specific machine learning model. Scoring the predicted data model may further include testing an accuracy of a learnt training data model to match an accuracy of the reference data model. Scoring the predicted data model may further include scoring the tested and matched data model.

The method (500) further includes presenting the predicted and scored data model in one or more forms (508). In one embodiment, on or more forms may be a chart, a graph, a table or an insight in natural language. In another embodiment, the method may further include storing a predicted data model in the memory.

In one specific embodiment, the system may include a data acquisition engine which is substantially similar to the memory of FIG. 1. The system may also include a processing module which may further include a data processing engine, a target value selector, a variable selection engine, a feature engineering engine, a machine learning module, a narrative engine, a model storage device, a model development module, a model management module. The processing module is substantially similar to the processing subsystem of FIG. 1. The system may further include a visualization engine which is substantially similar to the display model of FIG. 1.

The data acquisition engine may be configured to receive the plurality of data sets from the web crawler. As used herein, the web crawler also known as spider is an internet bot that systematically browses the World Wide Web, typically for the purpose of web indexing or web spidering. The data processing engine may be operatively coupled to the data acquisition engine. The data processing engine may be configured to enhance the quality of the plurality of data sets. The data processing engine may also be configured to merge the plurality of internal data sets and the plurality of external data sets.

The target value selector may be operatively coupled to the data processing engine. The target value selector may be configured to select a category of variable from one or more variable. In such embodiment, the category of variable from one or more variable may be a categorical variable, a numerical variable or a dimension. The variable selection engine which may be operatively coupled to the target value selector. The variable selection engine may be configured to select one or more variables from the predictive model. In such embodiment, the variable selection engine may select one or more variables based on a statistical association and a plurality of use cases.

Further, the feature engineering engine may be operatively coupled to the variable selection engine. The feature engineering engine may be configured to identify a requirement of the feature engineering engine, further, based on the requirement of the feature engineering engine, the system may select a specific machine learning model that may best suit the requirement.

The machine learning module may be operatively coupled to the feature engineering engine. The machine learning module may be configured to select one or more machine learning models to classify and build a new model data. The machine learning module may also be configured to train and test the accuracy of the newly built model. The narrative engine may be operatively coupled to the machine learning module. The narrative engine may be configured to predict the newly built data model and to provide a summery on the predicted data model.

The system may further include a visualization engine which may be operatively coupled to the narrative engine. The visualization engine may be configured to present the summary of the predicted built model. In such embodiment, the system may present the summary of the predicted data model in the form of the chart, the graph, the tables or the insights based on the predicted data model. The processing module may further include a model storage device which may be operatively coupled to the visualization engine. The model storage device may be configured to store the newly built data model in the model storage device of the system.

The processing module may further include model development module which may be operatively coupled to the model storage device. The model development module may be configured to develop the predicted data model for further scoring and to calculate the accuracy of the predicted model. The system may further include a model management module which may be operatively coupled to the model development module. The model management module may be configured to track and monitor the accuracy of the scored model based on the plurality of received data sets.

Various embodiments of the system described above enable the automatic prediction and scoring of the data model. Also the predicted and scored data model is presented in various forms based on the type of built data model.

Also the system automatically craws the plurality of external data set from web for analysis. The system also provides end-to-end functionalities and features that are required in building, developing and maintaining statistical and machine learning models.

The system selects machine learning model, methodology and features which may enable the user to easily build and manage advanced predictive modelling solutions. Further, the system has the ability to comprehend and monetize data sets of huge size.

The system also achieves data integration and data preprocessing. The system also integrates the plurality of internal data set and the plurality of external data set for prediction and scoring of the received plurality of data set.

Various embodiments of the system described above also enable the system to produce insights of the predicted data model in very short time which makes the system very efficient.

The system is also independent of data scientists and data analysts to create briefs as the system creates the briefs automatically using machine learning models. The system is also very adaptive to a various new use cases.

Further, the system automatically forms and presents insights for the predicted and scored data models which are easily understandable by the user. Also the insights presented are in natural language which makes the system very user-friendly.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computing system for predicting and scoring a data model comprising:
    a processing unit;
    a memory operatively coupled to a system bus that couples the memory to the processing unit, wherein the memory receives a plurality of data sets and stores the plurality of data sets which are directed to the processing unit for prediction and scoring of the data model, wherein the processing unit is configured for:
        selecting one or more variables based on a plurality of parameters;
        applying feature engineering and transformation on one or more variables to extract a plurality of features from the plurality of data sets;
        building new data model based on the plurality of features;
        evaluating a classification technique to select a right machine learning model based on a plurality of elements;
        predicting a newly built data model based on an evaluated classification technique; and
        scoring the predicted data model; and
    a display model operatively coupled to the processing unit and configured to present the predicted and scored data model in one or more forms.

2. The computing system as claimed in claim 1, wherein receiving the plurality of data set comprises receiving the plurality of data from a plurality of means, and wherein the plurality of means comprises at least one of: a web, a manual entry of data, a local data and an experimental data.

3. The computing system as claimed in claim 1, wherein the plurality of parameters comprises a use case, a statistical influence and a previous predictive sample.

4. The computing system as claimed in claim 1, wherein the plurality of elements comprises a data quantity, a data volume, a computational resource, a data type, a use case, a plurality of features, a plurality of model performance and a historical model.

5. The computing system as claimed in claim 1, wherein the one or more forms comprises a chart, a graph and an insight.

6. The computing system as claimed in claim 1, further comprising an alert module operatively coupled to the processing unit and configured to alert the system in a plurality of situations.

7. The computing system as claimed in claim 6, wherein the plurality of situations comprises a degradation of data accuracy and a difference in the predicted model and the historical model.

8. A method for predicting and scoring a data model comprising:
    receiving and storing, at a memory, a plurality of data sets;
    selecting, by a processing unit, one or more variables based on a plurality of parameters;
    applying, by the processing unit, feature engineering transformation on the one or more variables to extract a plurality of features from the plurality of data sets;
    building, by the processing unit, new data model based on the plurality of features;

evaluating, by the processing unit, a classification technique to select a right machine learning model based on a plurality of elements;

predicting, by the processing unit, a newly built data model based on an evaluated classification technique;

scoring, by the processing unit, the predicted data model; and presenting, a display model, the predicted and scored data model in one or more forms.

9. The method as claimed in claim 8, wherein scoring the predicted data model in step comprising:

splitting a predicted data model into a training data model and a reference data model;

learning the training data model using a specific machine learning model;

testing an accuracy of a learnt training data model to match an accuracy of the reference data model; and scoring the tested and matched data model.

10. The method as claimed in claim 8, further comprising storing a predicted data model in the memory.

* * * * *